United States Patent
Chen et al.

(10) Patent No.: US 6,175,840 B1
(45) Date of Patent: *Jan. 16, 2001

(54) METHOD FOR INDICATING THE LOCATION OF VIDEO HOT LINKS

(75) Inventors: Jeane Chen; Ephraim Feig, both of Chappaqua; Liang Jie Zhang, White Plains, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/962,559

(22) Filed: Oct. 31, 1997

(30) Foreign Application Priority Data

Nov. 1, 1996 (CN) .................................................. 96122685

(51) Int. Cl.⁷ ...................................................... G06F 15/00
(52) U.S. Cl. ........................... 707/501; 345/344; 709/217; 709/218
(58) Field of Search ................................... 707/501, 512; 345/112, 332, 327, 328, 145, 146, 357, 341; 709/217, 218

(56) References Cited

U.S. PATENT DOCUMENTS

| | | | |
|---|---|---|---|
| 5,361,081 | * | 11/1994 | Barnaby ................................ 345/145 |
| 5,440,678 | * | 8/1995 | Eisen et al. ........................... 395/154 |
| 5,539,871 | * | 7/1996 | Gibson ................................. 707/501 |
| 5,553,225 | * | 9/1996 | Perry ..................................... 345/341 |
| 5,657,050 | * | 8/1997 | McCamnridge et al. ............ 345/145 |
| 5,708,845 | * | 1/1998 | Wistendahl .......................... 707/501 |
| 5,737,553 | * | 4/1998 | Bartok ................................. 345/328 |
| 5,739,817 | * | 4/1998 | Glei et al. ............................ 345/341 |
| 5,745,710 | * | 4/1998 | Clanton, III et al. ................ 345/328 |
| 5,774,664 | * | 6/1998 | Hidary et al. .................... 395/200.48 |
| 5,774,666 | * | 6/1998 | Portuesi ............................... 709/218 |
| 5,778,181 | * | 7/1998 | Hidary et al. .................... 395/200.48 |
| 5,784,056 | * | 7/1998 | Nielsen ................................ 345/332 |
| 5,890,172 | * | 3/1999 | Borman et al. ...................... 707/501 |
| 5,900,863 | * | 5/1999 | Numazaki ........................... 345/158 |
| 5,918,012 | * | 6/1999 | Astiz et al. .......................... 709/217 |

OTHER PUBLICATIONS

Chen, Shenchang E., QuickTime VR: an image-based approach to virtual environment navigation, 22nd annual ACM conference on Computer graphics, pp. 29–38, Aug. 1995.*

* cited by examiner

Primary Examiner—Stephen S. Hong
Assistant Examiner—William L. Bashore
(74) Attorney, Agent, or Firm—Scully, Scott, Murphy & Presser; Daniel P. Morris, Esq.

(57) ABSTRACT

A method for indicating the location of time dependent video hot links to a user, comprising the steps of: displaying a motion video presentation on a first portion of a display device, the video presentation including a hot link region which can be selected by a user to link to different content; displaying an indication of the presence of the hot link region in the video presentation. The method may comprise the further step of altering a visual attribute of at least a portion of the hot link region when a user manipulable cursor is within the first portion. The method may comprise the further step of displaying an indication of the presence of the hot link region in the video presentation on a second portion of the display screen.

3 Claims, 2 Drawing Sheets

METHOD FOR INDICATING THE LOCATION OF VIDEO HOT LINKS

BACKGROUND OF THE INVENTION

Technical Field

The present invention relates to information processing of computer networks, more specifically, to a method for indicting the location of video hot links.

Prior Art

Hypermedia is a term used to describe the fusion of two other new technologies: multimedia and hypertext. Multimedia refers to information forms containing text, image, graphics, audio and video. A hypertext document is one which is linked to other documents via hyperlinks. A hyperlink often appears in a hypertext document as a piece of highlighted text. The text is usually a word or phrase describing something of which a user might want further information. When the user activates the hyperlink, typically by clicking on it using a mouse, the user view is changed so as to show the linked document, which typically contains more information on the highlighted word or phrase concerned. Hyperlinks make it easy to follow cross-references between documents. Hypermedia documents are hypertext documents with multimedia capabilities. The regions on the screen which are active hyperlinks are called hot-links.

Nowadays, most people are familiar with the application of hypertext by using a mouse to click on hot-links on computer displays of homepages from the World Wide Web (the Web) on the Internet. Data on the Web is located via URLs. URL stands for Uniform Resource Locator. It is a draft standard for specifying an object on the Internet. It specifies access method and the location for the files. Documents on the Web are written in a simple markup language called HTML, which stands for Hypertext Markup Language. File formats of data on the Web are specified as MIME formats; MIME stands for "Multipurpose Internet Mail Extensions". (Reference: http://www.oac.uci.edu/indiv/ehood/MIME/MIME.html). Examples of File formats on the Web are .au (probably the most common audio format), .html (HTML files), .jpg (JPEG encoded images), .mid (Midi music format), .mpg (MPEG encoded video), and .ps (postscript files).

While presently hypertext technology is most common in text and image media, it is beginning to also appear in animation and video. HyperVideo is the name for video augmented with hyperlinks. NEC corporation has demonstrated to Newsbytes such a system, named video hypermedia system, that will bring the point and click capabilities of hypertext to full motion video (NEC's Video Hypertext System, Newsbytes News Network, Jul. 31, 1995.).

HyperCafe is an experimental hypermedia prototype, developed as an illustration of a general hypervideo system (Nitin "Nick" Sawhney, David Balcom and Ian Smith, HyperCafe: Narrative and Aesthetic Properties of Hypervideo, Hypertext 96: Seventh ACM Conference on Hypertext (Recipient of the first Engelbart Best Paper Award at Hypertext 96, Mar. 20, 1996), http://silver. skiles. gatech. edu/gallery/hyper cafe/HT96_Talk/). This program places the user in a virtual cafe, composed primarily of digital video clips of actors involved in fictional conversations in the cafe. Hypercafe allows the user to follow different conversations, and offers dynamic opportunities of interaction via temporal, spatio-temporal and textual links to present alternative narratives.

VideoActive is an authoring tool for the creation of interactive movies (HyperVideo Authoring Tool (User Notes), http://ephyx.com/, Pre-Release version, Feb. 1996). It uses the HyperVideo technology to include hot-links in digital video files. The tool allows one to prepare video clips with the hot-link information and then to link them with other types of media.

Hot links in hypertext files are highlighted presently by way of color variation. When normal hypertexts are black, for instance, the hypertexts containing hot links are of another color (e.g. blue). In this way, the users can learn whether there exists a hot link in the hypertexts through changes of the colors. However, color is an important information in other hypermedia (image and video) files, hence the user might get a distorted image and video if the same method as mentioned above were still used to indicate whether there exist hot links in the image and video files. In case that there is a red flower in a certain frame of a video, for instance, the information contained in the video itself will evidently distorted if the hot link on the red flower is indicated directly by way of color variation. Therefore, it is undesirable to directly adopt the method of color variation in hypermedia (such as video) files. In the current hypervideo demo systems, the mouse cursor is often moved into a video display window and is moved around continuously within the window to find out whether there exist hot links in the video. For instance, when the cursor shape changes, it shows that there is a hot link. The method for seeking hot links contained in the video by way of mouse cursor's roaming within the video window is very inconvenient.

The objective of the invention is to provide a method for indicating the location of time dependent video hot links to a user, including the method for indicating the presence and the location of a hot link.

SUMMARY OF THE INVENTION

Accordingly, the present invention provides a method for indicating the location of time dependent video hot links to a user, comprising the steps of: displaying a motion video presentation on a first portion of a display device, the device presentation including a hot link region which can be selected by a user to link to different content; displaying an indication of the presence of the hot link region in the video presentation.

The method of the invention may comprise the further step of altering a visual attribute of at least a portion of the hot link region when a user manipulable cursor is within the first portion.

The method of the invention may comprise the further step of displaying an indication of the presence of the hot link region in the video presentation on a second portion of the display screen.

With the method of the present invention, it is possible to indicate the presence and location of a hot link without mouse cursor roaming or intrusion of the active video window. That is to say, a user can view in a non-intrusive mode while he can get the information about the presence and the corresponding location (if present) of a hot link.

BRIEF DESCRIPTION OF THE DRAWINGS

Preferred embodiments of the present invention will now be described by vary of example only, with reference to the accompanying drawings, in which.

DETAILED DESCRIPTION OF THE PREFERRED EMBODIMENTS OF THE INVENTION

Figure 1:
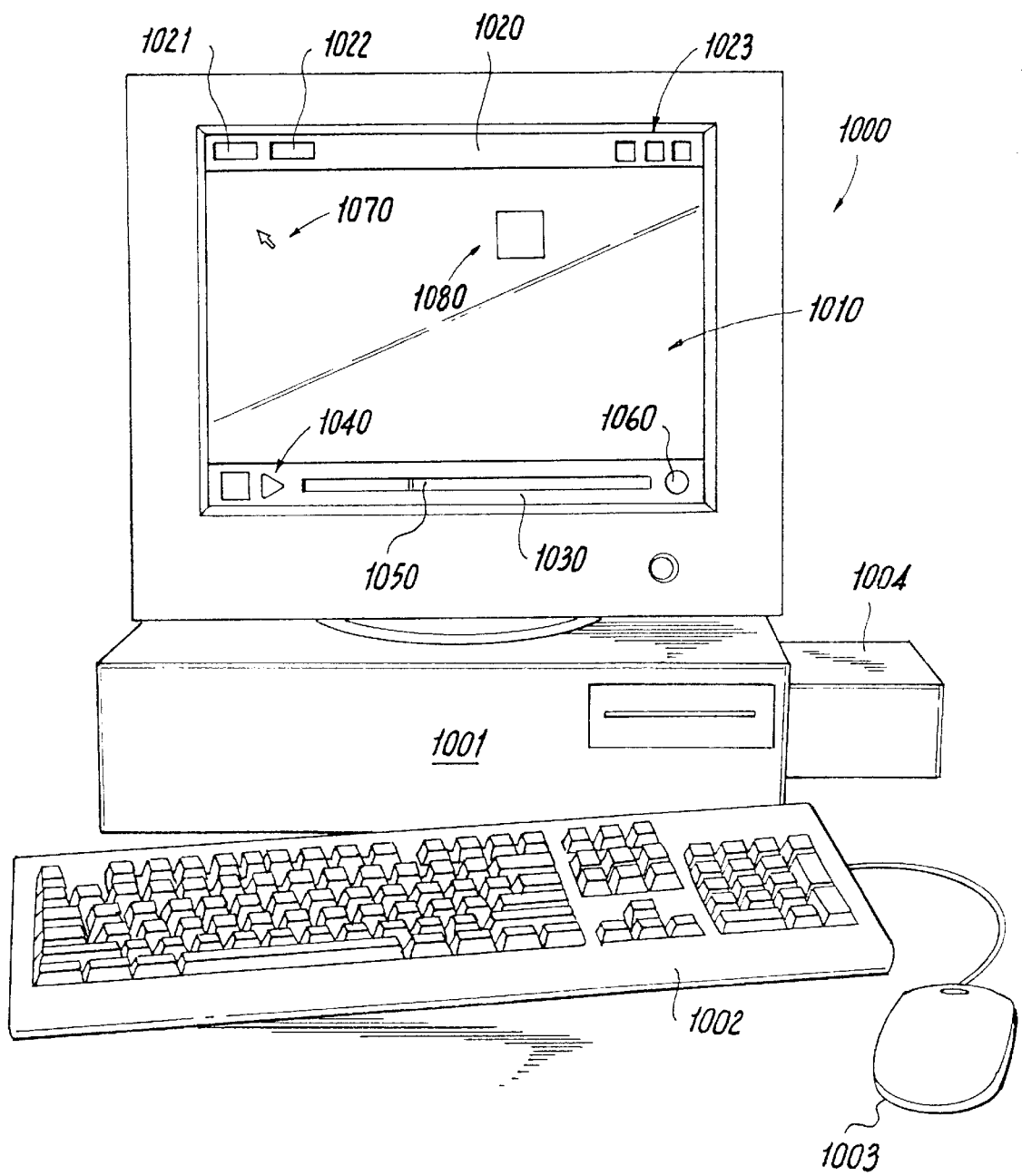
FIG. 1 shows schematically a first embodiment of the present invention.

FIG. 1 shows schematically a first embodiment of the invention. In this embodiment, video is being displayed on a computer monitor 1000. This monitor displays data (text, video) which is generated by a computer 1001, to which are also attached a keyboard 1002 and a mouse 1003 in standard configuration. Speakers are attached to the computer. The video is accompanied by audio, as is typical in motion pictures. The computer is also connected in standard fashion to a network connecting device 1004 such as ethernet, token ring or telephone modem, which allows access to the World Wide Web.

The video is contained inside a video display window 1010. The window is bordered in standard fashion, to allow for moving it or resizing it by utilizing the mouse in standard fashion. The top border is a standard panel bar 1020 with an active file button 1021 which, when activated by pointing the cursor at it and clicking with the mouse, displays a menu for initiating actions such as exiting the video program; an active button 1022 which, when activated, displays an options menu; and active buttons 1023 for miniaturizing the display window to an icon on the screen or on a control bar (as in Windows 95), for fast resizing between normal size to full screen size, and for fast termination of the video program. Such button configurations are standard. Underneath the window is a panel bar 1030 which contains active regions (buttons) 1040 for controlling typical video functions as play and stop/pause, and an active slider 1050 For controlling random access to temporal locations in the video. Such configurations are standard in the art.

The displayed video has been encoded with embedded hyperlinks. These are certain regions 1080 within the video display window for which at certain time intervals special information has been encoded in the video data stream that point to html files in various URLs which are connected to the computer network. Such region 1080 during such time period is called a hot-link.

On the panel bar 1030 is an active light region 1060. During those time periods in which there are no hot-links encoded in the video, the light region is green. During those time periods in which there are hot-links in the video, the light region is red. If the cursor is inside the display window while there is a hot-link in the video, that region is highlighted by either a color change or an easily observed border; the option is offered in the options menu.

If a user clicks the left button of the mouse while the cursor 1070 is inside the hot-link, a signal is transmitted from the computer to the encoded URL requesting the delivery of the linked html file back to the computer. The contents of the html file contain instructions which the computer executes. Typically these will be to display text or multimedia data on the monitor; the multimedia data may also include audio played out of the speakers. While this new data is being displayed, the video is paused. This is achieved either by a pause command on the video player if the video data has already been downloaded to a local file, or (more typically) by transmitting a pause request to the URL from which the hot video is being streamed, and having that location issue a pause command to stop the streaming. If the originating URL does not support a pause command, then the video continues. The user has an option to miniaturize the video display window while he is viewing the newly displayed information. At some later time, the user may resume the hot video by pointing to the play button in 1040 with the cursor and clicking a button on the mouse.

If the viewer chooses to view the video in full screen mode (which he can do by clicking the resize button in 1023), then the active light region is embedded in the video display window (now the entire display window) at the bottom right corner.

At any time period, more than one hot-link may be present in the video, and they are simultaneously visible if the cursor is inside the video display window.

Figure 2:
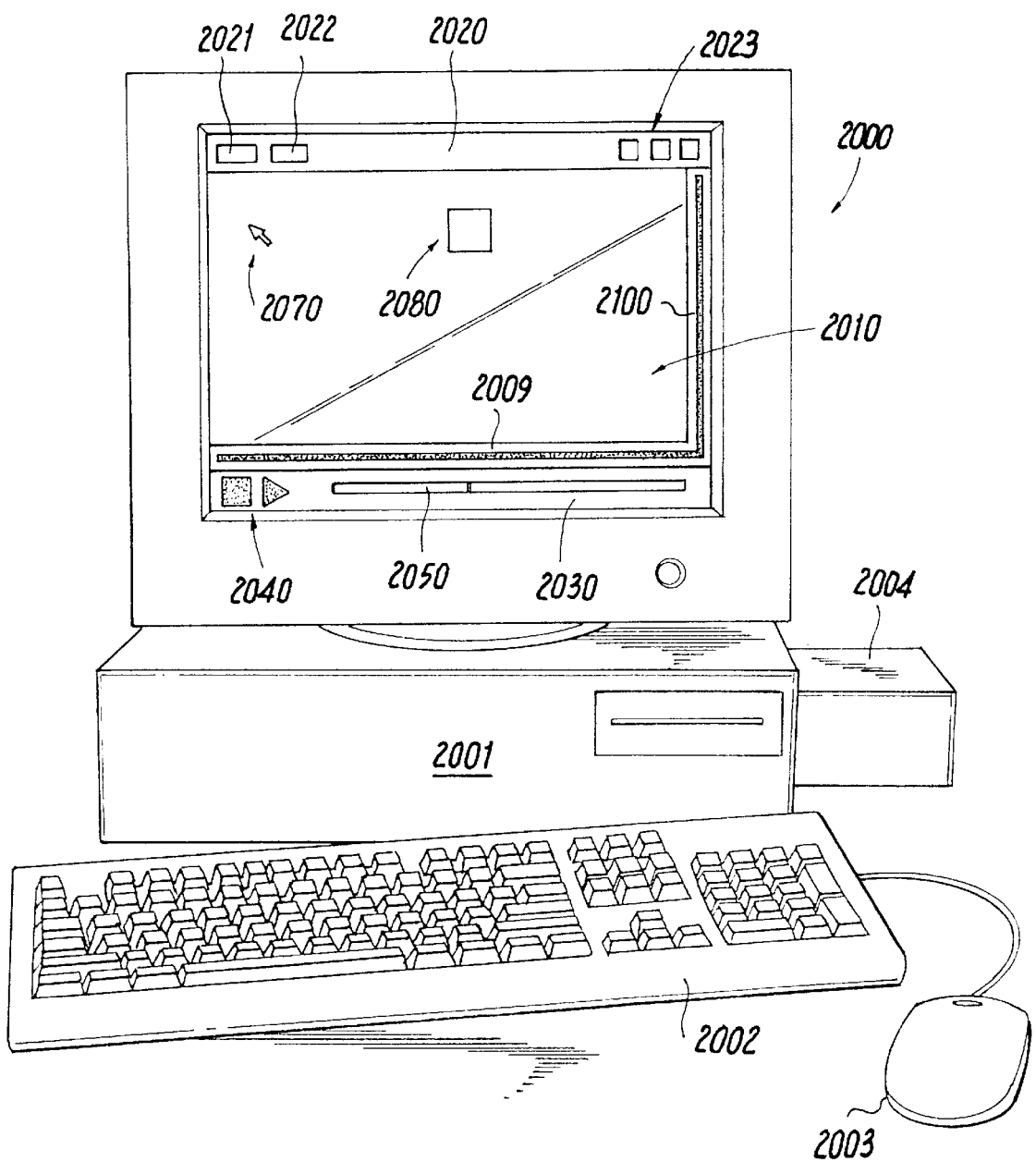
FIG. 2 shows schematically a second embodiment of the present invention.

A second embodiment of the invention is schematically shown in FIG. 2. The configuration is similar to that of FIG. 1, with objects (2xxx) of FIG. 2 corresponding to objects (1xxx) of FIG. 1. An object corresponding to 1060 of FIG. 1 is not present in FIG. 2. Objects 2009 and 2100 of FIG. 2 have no corresponding objects in FIG. 1 Object 2009 is a horizontal indicator bar and object 2100 is a vertical indicator bar. When a hot-link is present in the displayed video, the X-coordinate of the center of the hot-link is indicated on the horizontal indicator bar directly below it by a bright dot, and the Y-coordinate of the center of the hot-link is indicated on the vertical indicator bar directly to its right by a bright dot. As in the previous embodiment, if the cursor is inside the display window while there is a hot-link in the video, that region is highlighted by either a color change or an easily observed border; the option is offered in the options menu. The user accesses the html file corresponding to the hot region in the same manner as in the first embodiment.

Since the indicators of the second embodiment pinpoint the center of the hot-link, there is an option also accessible via the option menu for eliminating the hot-link highlighters inside the video display window. The user can still quickly move the cursor to the appropriate X–Y coordinate position within the video display window and click on the hot-link. Since hot regions typically correspond to recognizable image segments, such as people, faces, animals, objects, the user need not position the cursor exactly at the X–Y coordinates to be within the hot-link region. Another option within the options menu is that the cursor itself is changed when it is inside the hot-link. This may be a color change or an addition of a question mark next to the typical cursor, or other change.

Another option accessible via the options menu is that the horizontal and vertical indicator bars exhibit via lighted horizontal and vertical line segments the corresponding support intervals of hot-link. Thus, if the hot-link is a rectangle, then the horizontal bar is lighted along the entire interval directly below the hot-link, and the vertical bar is lighted along the entire interval directly to the right of the hot region. If the hot-link is an ellipse, the lighted intervals on the indicator bars may correspond to either the largest rectangle whose sides are parallel to the indicator bars and which lies either completely inside the ellipse of the smallest rectangle whose sides are parallel to the indicator bars and which contains completely the ellipse. Multiple hot-links in a single frame may have regions whose x-coordinates or y-coordinates overlap. Various options for user interfaces to convey this information on the indicator bars are envisioned, and follow directly from the invention herein.

It will be observed that the invention provides the user the ability to view a hot video without intrusion of hot-link indications inside the video window as well as the ability to view the video with indicators inside the video window visible. The choice can be dynamically invoked by simply moving the cursor out of or into the video display window. When the user is viewing in a non-intrusive mode, the light indicator provides information as to the presence of a hot region, alerting the viewer that if he so chooses, he can quickly determine the location of the hot-link by moving the cursor inside the display window.

Creation of hot video content is achieved in the following way. An MPEG encoded video source is used for this particular embodiment (D. LeGall, MOEG: A Video Compression Standard For Multimedia Applications, Communications of the ACM, Vol. 34, No. 4, April 1994). The MPEG system layer contains packets of video, audio, and user specified date (International Organization For Standardation, ISO/IEC JICI/SC291/WG1, Coding of Motion Pictures and Associated Audio, NO272, Jun. 10, 1994). The user specified data will contain the hot-link information. Hot-link information for a given frame in the video will be encoded in a packet which immediately precedes the packet which contains the beginning of the video data for that frame. A hot video editing system comprising an MPEG playback system is used. It can play back the MPEG video in real-time mode, slow mode, or single-frame-at-a-time mode. It also has editing tools for inserting the hot link information. At any desired frame, the user freezes the playback at that frame. Using the editing tools, the user indicates the desired region which is to be hot. After the region is indicated, the user labels the region with a pointer to a URL. A list of URLs for the particular video sequence is maintained, and displayed along the frozen single frame. If the desired URL is already in the list, the user simply has to click on it with a mouse to achieve the labeling. If this URL is new, the user has to enter it into the list and then point the hot-link to it. The editing system inserts this information into the user data packet, as discussed above.

An alternate embodiment for the creation of hot MPEG video, which is extensible to other video formats, is the following. A hot video editing system is used, as above. This time, instead of embedding the hot-link information into the MPEG system layer data stream, a new type of data stream is created, which mixes the MPEG system layer with the hot-link information. This will form a new MIME type, consisting of a sequence of hot video information for a particular frame, followed by the video data of that particular frame. Special start code symbols are used to indicate the start of a hot video data segment; and other special start code symbols are used to indicate the start of a MPEG video data segment.

Both hot video creation systems described above can be automated for faster creation of hot video. For example, motion estimation techniques as in MPEG encoding may be used to predict location of a hot-link in a frame from a previous frame. The interactive editing system allows the user to view the automatically created hot-link regions, and the user can make modifications if necessary.

A hot video decoder is utilized by a browser whenever it identifies the incoming data as hot video data; this identification is via the suffix of the data name. If the data is encoded using the first embodiment, with hot-link information embedded in the MPEG data stream, then the hot video decoder is an MPEG decoder which also understands the data provided by the user-specified data packets. The decoder determines start of video, audio or hot-link info from the packet start codes. It then utilizes these three sets of information, the hot video data to determine the active regions and the URLs to which they point, and the MPEG video and audio data to synchronize and display the audio and video. If the data is encoded using the second embodiment, the decoder determines start of video or hot-link info data from the start code headers. It then utilizes the two sets of information, the hot video data to determine the active regions and the URLs to which they point, and the MPEG audio/video data to playback the video.

A hot video decoder is created as follows. Using Microsoft's Visual Basic, one creates a main form which looks like the one in FIG. 1. It contains a video window, plus buttons, a slider, and a color indicator. The default color of the color indicator is green. The decoder utilizes an MPEG decoder which decodes data coming either from file or streaming data. The decoder also interprets user packet data, which contains the information regarding time and place of hot link regions in the video. The decoder sets up an array for hot-link region information. The array contains the coordinates of the hot link regions. The decoder also sets up a hot-link flag; if there is no hot-link region, the flag is set to 0; if there is a hot link region then the flag is set to 1. The decoder polls the flag every 33 milliseconds. If the flag is 1, indicating the presence of a hot link region, the color indicator turns red. The decoder then checks the hot link region to determine the position of the hot link region. It also checks the position of the cursor. If the cursor is inside the video window, then a border is displayed around the hot link regions. If furthermore the cursor is inside the hot link region, then the cursor shape is changed. If a user clicks the mouse while the cursor is inside a hot link indicator, then the linked page is displayed on the computer monitor, and the video is paused. If the hot link flag is 0, and if the color indicator was red, it now turns green; if there existed hot link regions, then all hot link region borders are removed; and if there was a special shaped cursor inside a hot link region, then the cursor resumes its default shape. Otherwise, the color indicator remains green, and the video proceeds undisturbed. The means of achieving the above described process are standard in the art.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by letters patent is:

1. A method for indicating the location of time dependent video hot links to a user, comprising the steps of:

displaying a motion video presentation on a first portion of a display device, the video presentation including a hot link region which is dynamically displayed for selection by a user to link to different content; and, displaying an indication of the presence of the hot link region in the video presentation in a non-intrusive manner on a second portion of the display device, said second portion including vertical and horizontal indicators adjacent said first portion of said display device for cooperatively indicating a location and size of one or more hot link regions present in said video presentation.

2. The method according to claim 1, characterized in that the mentioned step of displaying an indication of the presence of the hot link region in the video presentation comprises the further step of altering a visual attribute of a least a portion of the hot link region when a user manipulable cursor is within the first portion.

3. The method according to claim 2, characterized in that the mentioned step of altering a visual attribute of at least a portion of the hot link region can be extended to the method of direct displaying the hot link region in the video window.

* * * * *